Nov. 5, 1963
A. V. KLANCNIK
3,109,557
PARTS FEEDER FOR MACHINE TOOLS
Filed Feb. 6, 1961
3 Sheets-Sheet 1
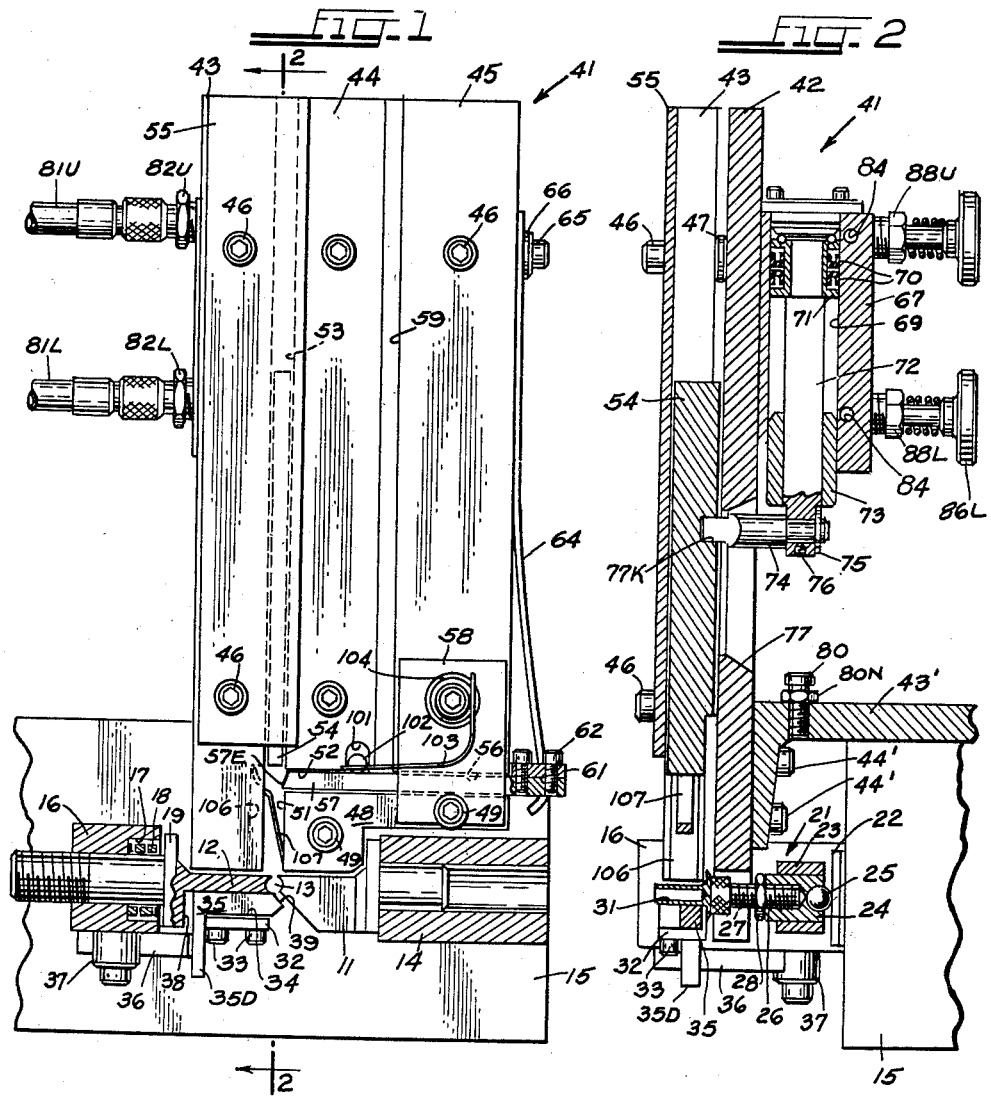
INVENTOR.
ADOLPH V. KLANCNIK
BY
Wallace, Kinzer & Horn
Attys.

Nov. 5, 1963 A. V. KLANCNIK 3,109,557
PARTS FEEDER FOR MACHINE TOOLS
Filed Feb. 6, 1961 3 Sheets-Sheet 2
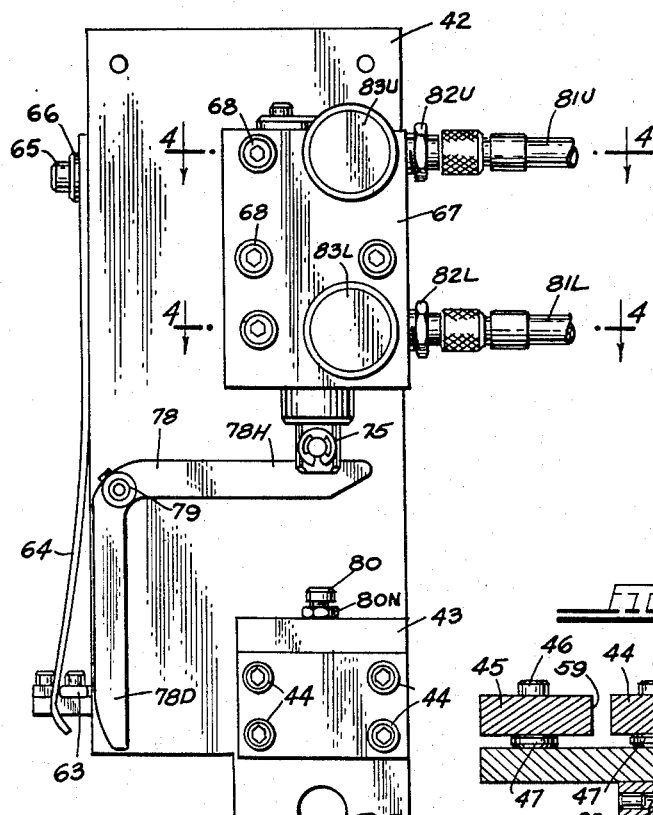
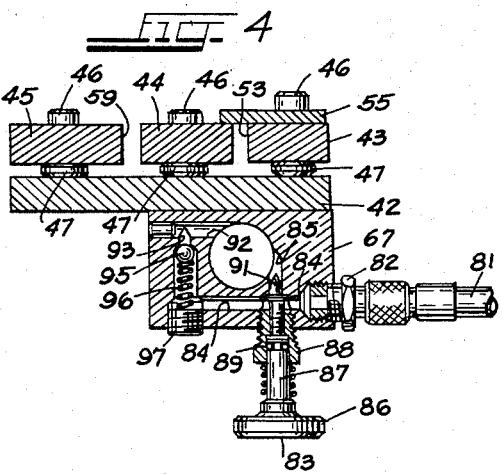
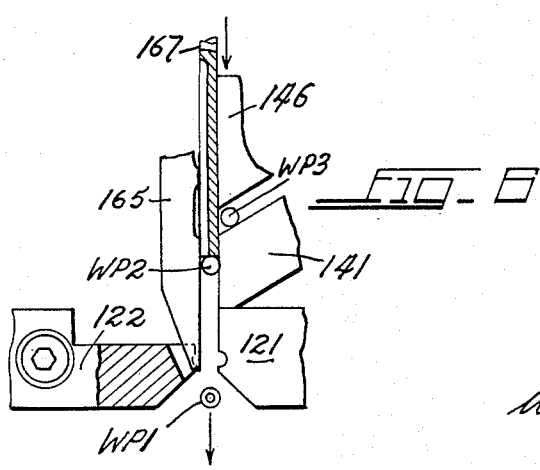
INVENTOR.
ADOLPH V. KLANCNIK
BY
Wallace, Kinzer & Horn
Attys.

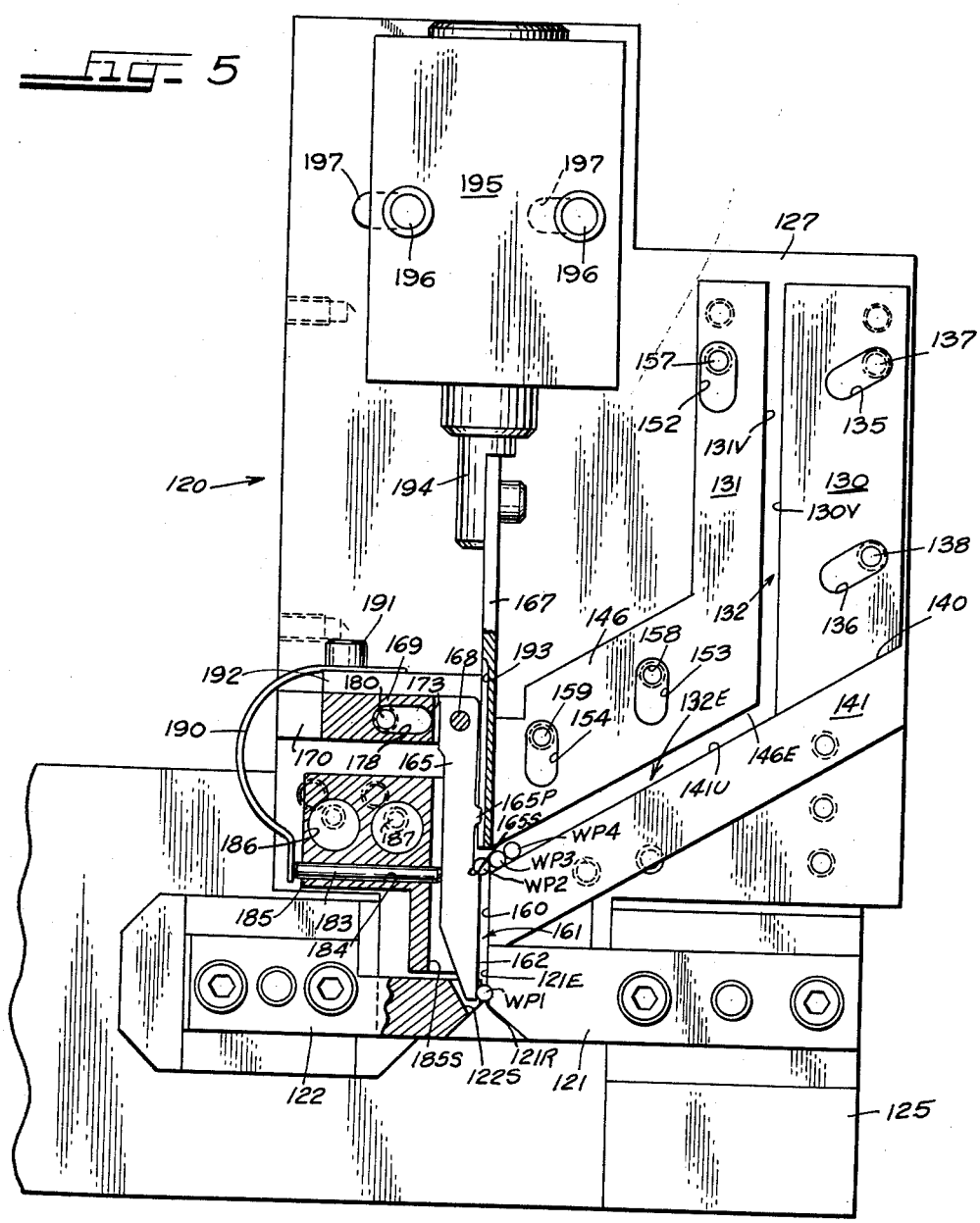

United States Patent Office 3,109,557
Patented Nov. 5, 1963

3,109,557
PARTS FEEDER FOR MACHINE TOOLS
Adolph V. Klancnik, 1020 Glenview Road, Glenview, Ill.
Filed Feb. 6, 1961, Ser. No. 87,140
16 Claims. (Cl. 221—238)

This invention relates generally to automatic machine tools incorporating automatic workpiece feeding mechanisms. This application is a continuation-in-part of application Serial No. 808,449, filed April 23, 1959, now abandoned.

More specifically this invention relates to a pneumatically actuated positive positioning fixture for supplying workpiece elements to be machined to a working station of a machine tool.

It is conventional practice to supply workpiece elements to be machined to a machine tool either manually or by means of a supply magazine which incorporates some sort of gravity feed. Manual feeding of such workpieces to the machine tool is undesirable because of the inherent danger of injury and also because of the low rate of production that is necessarily entailed. In the magazine feeding units heretofore known, parts that are relatively light in weight or of a configuration that makes them difficult to gravity feed have presented problems in maintaining continuous and accurate feeding of such parts.

In particular types of machining operations, such as hollow milling tapping, and external threading, the configuration of the rotating parts of the machine tool are such that it is necessary that the working pieces to be machined be maintained at a minimum distance from the working station of the machine tool. For this reason many conventional magazine feeding units which rely entirely on a gravity feed have not been generally usable for such machining operations.

Oftentimes in the feeding of workpieces having certain geometrical forms, such as a cylindrical configuration, there is a tendency for more than one part at a time to feed to the working station of a machine tool. This has been an additional reason why conventional magazine feeding units have been troublesome in operation.

Another shortcoming of conventional magazine feeding units has been that such units do not utilize the maximum productive capacity of an individual machine tool. While the actual machining operation can be performed only at a certain maximum rate, nevertheless the number of parts machined in a unit of time can be significantly increased by decreasing the time required to feed the individual parts to the working station, retain them there, and eject them from the working station.

It is a primary object of this invention to positively position elements to be machined at a working station of a machine tool.

It is another object of this invention to transfer elements to be machined from a storage magazine to a working station of a machine tool more rapidly than has heretofore been possible, and a related object is to so construct the magazine and related parts as to enable workpieces of variant size to be easily accommodated.

It is another object of this invention to provide a pneumatically actuated plunger for positively transferring an element to be machined through a feed channel of a magazine unit to a working station of a machine tool.

It is another object of this invention to provide a pair of plungers reciprocable within perpendicularly disposed supply channels and to incorporate a bell crank actuating lever for causing simultaneously actuation of the plungers in opposite directions within the respective channels to sequentially transfer an individual element to be machined first through one of the channels and then through the other of the channels on successive reciprocations of the plungers within the supply channels.

It is another object of the present invention to incorporate a plunger and a pneumatically actuated cylinder for positively transferring an element to be machined through a supply channel and to incorporate an air regulating valve in an air line to the pneumatic cylinder for regulating the rate at which air is supplied to the cylinder to prevent impacting of the plunger on the workpiece within the supply channel.

It is another object of this invention to incorporate in a machine tool an angled, generally vertically oriented supply channel for transferring by gravity an element or workpiece to be machined to a working station of the machine tool, and to incorporate a flexible or resiliently biased retaining member in the channel for maintaining the next workpiece in a spaced relation from the working station during the machining operation. Another object of the invention is to enable the foregoing to be accomplished under circumstances where said retaining member permits the next work piece to move to the work station while serving also to locate ultimately that workpiece accurately at the work station.

Other and further objects of the present invention will be apparent from the following description and claims and are illustrated in the accompanying drawings which, by way of illustration, show preferred embodiments of the present invention and the principles thereof and what is now considered to be the best mode contemplated for applying those principles. Other embodiments of the invention embodying the same or equivalent principles may be used and structural changes may be made as desired by those skilled in the art without departing from the present invention and the purview of the appended claims.

In the drawings:

FIG. 1 is a front elevation, partly in section, of a machine tool which includes one form of positive positioning fixture under the present invention for supplying elements to be machined to the working station for the machine tool;

FIG. 2 is an elevation in section taken in the direction of the arrows 2—2 in FIG. 1;

FIG. 3 is a rear elevation view of the machine of FIG. 1;

FIG. 4 is a sectional view taken in the direction of the arrows 4—4 in FIG. 3;

FIG. 5 is a front elevation, partly in section, of a machine tool equipped with another form of positive positioning fixture under the present invention; and FIG. 6 is a fragmentary view showing the position of certain parts shown in FIG. 5 when a workpiece is being ejected.

Referring now to FIGS. 1 and 2, a pair of clamping jaws 11 and 12 of an automatically actuated machine tool define a working station 13 therebetween. Jaw 11 is rigidly attached to a cylindrical support 14, which, in turn is fixedly attached to a frame member 15 of the machine tool. The jaw 12 is slidably received within a chuck 16. The end of the chuck 16 facing the working station 13 is formed with a recess 17. A coil spring 18 is seated at opposite ends on the base face of the recess 17 and on a radially outwardly directed flange 19 formed integral with the jaws 12. Thus the spring 18 biases the jaw 12 outwardly of the chuck 16. Stop means, not illustrated, limit the extent of the movement of the jaw 12 outwardly of the chuck 16. The entire chuck and jaw assembly 16 and 12 is slidable with respect to the frame member 15 so that the jaw 12 is movable toward and away from the fixed jaw 11 to grip and release an element or workpiece to be machined at the working station 13.

With particular reference to FIG. 2, there is illustrated a backup stop indicated generally by the reference numeral 21. This backup stop comprises a generally wedge-shaped cam 22 affixed to the frame member 15 and extending laterally therealong. An outer frame unit 23 is spaced from the cam 22 and supports an insert 24 therein. The surface of insert 24 facing the cam 22 is formed with a hemispherical recess and a ball bearing 25 is disposed therein. At the surface opposite the cam 22 the insert 24 is provided with an internally threaded recess 26 and a knurled headed cap screw 27 is threadedly received therein. A lock nut 28 is provided for locking the cap screw at any given position within the recess 26. The knurled head on the cap screw 27 furnishes a backup stop for a workpiece, which, as illustrated in FIG. 2, may be a hollow shank rivet 31, and which may be clamped between the jaws 11 and 12 at the working station 13.

The details of the clamping jaws and the backup stop 21 and the method of operation of the overall machine tool are more fully set forth in co-pending application Serial No. 796,634, filed March 2, 1959, now Patent No. 3,001,422. Briefly reviewed, the movable jaw 12 is movable between a first position, wherein the jaws 11 and 12 tightly grip an element to be machined therebetween in the working station 13, and a second position, wherein the jaws 11 and 12 release the workpiece. The frame member 23 is laterally movable with respect to the cam 22 and is moved concurrently with the movement of jaw 12 in a manner such that the knurled cap screw 27 is moved into a backup relation with the workpiece, that is, moved leftwardly as illustrated in FIG. 2, at the same time that jaw 12 engages a workpiece in gripping relation with the jaw 11.

Referring to FIG. 1, a plate 32 is attached to the underside of the movable jaw 12 by cap screws 33 in a manner such that it is spaced from the lower surface of the movable jaw to form a guide channel 34. An escapement trigger 35 is slidably received within the guide channel and is biased outwardly of the guide channel, rightwardly as illustrated, by a flat spring 36. Spring 36 is attached at one end to a depending arm 35D of the escapement trigger 35 and is fixed at an opposite end to the chuck 16 by means of a slotted head fitting 37. The escapement trigger 35 is movable between two positions. In one position, the spring 36 biases the escapement 35 outwardly of the channel to a position in which a foreward face of the depending arm 35D abuts an edge of the plate 32. In this position, the escapement trigger is operative to retain a workpiece at the working station 13 regardless of the relative positions of the gripping jaws 11 and 12. The escapement 35 is movable inwardly of the channel 34 against the bias of the spring 36 to a second position in which a rearward face of the depending arm 35D abuts a vertical recessed face 38 formed on the lower portion of the jaw 12. The escapement 35 is movable to the second position through a camming action of a workpiece acting on a beveled upper edge 39 of the escapement in a manner to be described hereinbelow. In this second position of the escapement 35, a workpiece may be ejected from the working station 13 when the jaws are in a workpiece releasing position.

In accordance with this form of the invention, there is provided a positive positioning magazine unit, indicated generally by the reference numeral 41, for supplying elements to be machined to the working station 13. This positive positioning fixture comprises a main back plate 42 which is attached to an L-shaped bracket 43' by means of cap screws 44', see FIG. 2. The bracket 43 is in turn welded or otherwise rigidly attached to the main frame member 15 of the machine tool.

On one side of the back plate 42, three parallel extending guide rails 43, 44 and 45 are attached and spaced therefrom by a plurality of cap screws 46 and spacer elements 47, see FIG. 4. The guide rail 43 is of greater length than the guide rails 44 and 45 and extends within close proximity of the upper surface of the movable jaw 12 as shown in FIG. 1. A guide plate 48 is attached by cap screws 49 to the same side of the back plate 42 as the guide rails 43 to 45. The guide plate 48 is generally L-shaped and is spaced from the inner vertical edge of the guide rail 43 and the lower edge of the guide rail 44 to define a pair of perpendicularly disposed channels or paths 51 and 52 therewith.

The guide rails 43 and 44 are horizontally spaced from each other to provide a guide channel 53 vertically aligned with the channel 51 defined by the guide rail 43 and the guide plate 48. A plunger bar 54 is slidably received within the guide 53 and is reciprocable along the full length of the channel 51. A cover plate 55 is attached to the backup plate 42 by the same cap screws that attach the guide rail 43 to the back plate. The cover plate 55 overlaps the guide rails 43 and 44 to provide a completely inclosed guide for the plunger 54.

The lower edge of the guide rail 45 and the upper edge of the guide plate 48 are vertically spaced to provide a guide channel 56 which is horizontally aligned with the channel 52 defined by the lower edge of the guide rail 44 and the upper edge of the guide plate 48. A plunger bar 57 is slidably disposed within the guide 56 and is reciprocable along the full length of the channel 52. A cover plate 58 overlaps the guide rail 45 and the guide plate 48 to form a completely inclosed guide for the plunger 57.

The guide rails 44 and 45 are spaced horizontally to define a channel 59 therebetween. The channel 59 constitutes a vertical magazine storage channel for storing elements or workpieces to be machined. The channel 52 constitutes a transfer channel for transferring individual elements from the outlet of the channel 59 to the inlet of the channel 51. The channel 51 constitutes a vertical feed channel for feeding individual elements to be machined to the working station 13 aligned with the outlet end of the channel.

An L-shaped bracket 61, FIG. 1, is affixed by cap screws 62 to the upper surface of that portion of the plunger 57 which extends outwardly of the guide 56. One leg 63, FIG. 3, of the bracket extends across an edge of the back plate 42. A flat spring 64 is attached to this vertically extending edge of the back plate by a cap screw 65 and washer 66. The spring 64 abuts one edge of the leg 63 of the bracket 61 to bias the plunger 57 inwardly of the channel 52 to the position illustrated in FIG. 1.

A double acting pneumatic cylinder unit 67, FIG. 4, is attached by cap screws 68 to the surface of the back plate 42 opposite that on which the guide rails are mounted. Referring to FIG. 2, the power cylinder 67 comprises an inner cylindrical bore 69 and a piston head 71 slidable therein. A pair of U-shaped sealing rings 70 are contained within a pair of circumferentially extending recesses formed in the piston head for providing a sliding seal with the bore 69. A piston rod 72 is attached to the lower surface of the piston head 71 and extends through a bushing 73 in the lower end of the power cylinder. At its lower extremity, the piston rod 72 is provided with an aperture through which a turned down shank of a pin 74 is passed. A snap ring 75 and a set screw 76, in co-operation with the recessed face formed by the turned down section of the pin, rigidly position the pin 74 within the aperture of the piston rod 72.

The back plate 42 is provided with an elongated vertically extending slotted recess 77, and the pin 74 projects therethrough. This slotted guide is aligned with the guide channel 53 formed between the guide rails 43 and 44. As is seen with particular reference to FIG. 2, the plunger bar 54 is formed with a recessed key seat 77K, and the end of the pin 74 opposite that connected to the piston rod 72 is received therein.

Referring to FIG. 3, it is seen that a bell crank 78 is pivotally connected by a pivot pin 79 to the back plate. The bell crank 78 comprises a horizontally extending arm 78H which, at its upper edge, abuts the lower surface of the pin 74. The bell crank 78 also includes a depending arm 78D which abuts the edge of the leg 63 of the bracket 61 opposite that on which the spring 64 acts.

A screw 80, FIG. 2, is threadedly received in the portion of the bracket 43′ directly below the power cylinder 67. A lock nut 80N is provided for maintaining the head of screw 80 at a desired position with respect to the bracket 43′. The screw 80 thus constitutes a variable height stop for limiting the downward stroke of piston rod 72.

Two air supply hoses 81U and 81L are connected through fittings 82U and 82L to the upper and lower portions of the power cylinder 67. Air flow regulating valves 83U and 83L, FIG. 3, are provided for regulating the rate at which the actuating air can be supplied to the upper and lower sides of the piston head 71.

With particular reference to FIG. 4, it is seen that the cylinder 67 is provided with drilled passageways 84 and 85 for supplying actuating air to the piston chambers. Valves 83 comprise knurled outer knobs 86 and stems 87. The stems 87 are threadedly received within bushings 88 which are in turn threadedly received within a wall of the cylinder 67. A conventional O-ring 89 prevents leakage between the valve stem 87 and the bushing 88. At its innermost end, the valve stem 87 is provided with a tapered valve element 91 which coacts with the walls of the passage 85 to vary the size of the orifice therebetween. The cylinder 67 is also provided with passageways 92, 93 and 84 for exhausting air from the piston chambers. A ball-check valve 95 is seated in the passage 93 and biased to a flow blocking position by a spring 96 which is seated on the ball-check valve and an inner surface of a plug 97 threadedly received in one wall of the cylinder 67.

In the operation of the structure thus far described, a plurality of elements to be machined are placed in vertical stacked relation within the storage channel 59 formed between the guide rails 44 and 45. With no pressure air supplied to piston 67 through either lines 81U or 81L, the flat spring 64, acting on the bracket 61, biases the plunger bar 57 inwardly, as illustrated in FIG. 1, of the transfer channel 52. The elements to be machined are thus retained within the storage channel 59.

Next, a control valve, not illustrated, is positioned to supply air pressure through the line 81U to actuate the piston head 71 downwardly until rod 72 abuts the stop 80. This causes pin 74 to rotate the bell crank 78 in a clockwise direction about the pivot pin 79 to move the plunger 57 outwardly of the channel 52 to a position wherein an element to be machined can gravity feed from the storage magazine 59 to the transfer channel 52. The adjustable stop 80 is positioned to permit sufficient travel of the piston 71 to move the plunger 57 a sufficient distance to provide such free feed of an element to be machined from the channel 59 to the channel 52.

Simultaneous with the outward movement of the plunger 57, the plunger 54 is moved downwardly of the empty feed channel 51. Next, pressure air is supplied to the lower end of the cylinder 67 through the conduit 81L and conduit 81U is connected to exhaust incidental to positioning of a control valve connected to the respective conduits. This air pressure in the lower part of the power cylinder moves the piston head 71 upwardly to retract plunger 54 from the channel 51 and permits the bell crank 78 to be rotated in a counterclockwise direction about the pivot pin 79 by the biasing action of the flat spring 64. Spring 64 thus shifts the plunger 57 inwardly of the channel 52 to transfer a work-piece to the upper, inlet end of the feeding channel 51 in the preparation for the next down stroke of the plunger 54.

Next, pressure air is again supplied to the conduit 81U, and the conduit 81L is connected to exhaust. This causes outward actuation of the plunger 57 within the transfer channel 52 to pick up another workpiece at the inlet of the transfer channel 52 in the manner described immediately above. Simultaneously with this outward movement of plunger 57, the plunger 54 is moved downwardly of the channel 51 to position the individual workpiece previously supplied through the transfer channel 52, at the working station. With the specific gripping jaws illustrated, it is, of course, necessary that the jaw 12 be coordinately controlled with the action of the piston 67 so that the movable jaw is actuated to a workpiece releasing position, leftwardly of that illustrated in FIG. 1, on the down stroke of the plunger 54.

Subsequently, the movable jaw 12 is moved to a workpiece gripping position and the pressure air is supplied through the conduit 81L while conduit 81U is connected to exhaust to reciprocate the plunger 54 outwardly of the feed channel 51 and reciprocate the plunger 57 inwardly of the transfer channel 52 to position another workpiece in the feed channel in preparation for the next down stroke of the plunger 54.

The machining operation is performed at the working station 13 and subsequently the movable jaw 12 is shifted leftwardly to a workpiece releasing position. As mentioned hereinabove, the escapement trigger 35 at this time is biased outwardly of the channel 34 to retain the machined workpiece at the working station.

Concurrently, with the leftward or releasing movement of the jaw 12, the actuating air is supplied to conduit 81U to move the plunger 54 downwardly of the feeding channel 51 and transfer an individual workpiece from the channel to the working station. The stroke of the plunger 54 is sufficient to cause the lower portion of the unmachined workpiece to engage the upper portion of the machined workpiece retained within the working station 13 by the escapement 35 and to cause the lower portion of the machined workpiece to exert a camming action on the beveled edge 39 to shift the escapement 35 inwardly of the channel 34 and permit the machined workpiece to be ejected from the working station. Immediately after ejection of the machined workpiece, the escapement springs back to a retaining position to retain the unmachined workpiece within the working station.

Thus, on successive actuations of the piston 71 the plunger 57 transfers an individual workpiece from the outlet of the storage channel 59 through the transfer channel 52, and the plunger 54 positively transfers the workpiece through the feeding channel 51 to the working station 13 and ejects the machined workpiece past the escapement trigger 35.

The regulation of the rate at which air is supplied to the top and bottom chambers of the cylinder 67 serves a very important purpose by preventing a rapid initial flow of air to the piston chambers, whereby impacting action of the plungers 54 and 57 on the workpieces within the respective channels 51 and 52 is prevented. The valve element 91 may be suitably positioned with respect to the conduit 85 so that any desired rate of travel of the plungers within the chambers may be obtained. Thus, parts of relatively fragile construction may be positively transferred through the channels and to the working station with no problems of jamming due to deformation of the workpieces within the channels.

It should be noted with particular reference to FIG. 4 that the air line 81 both pressurizes and exhausts the working chamber. Thus, pressure air flows through the air line 81, passageway 84, pass the valve 91, and through passageway 85 to a pressure chamber on one side of the piston head 71. Simultaneously, pressure air also flows through the passageway 84 past the stem of the valve and to the back side of the check valve 95. Thus, equal pressures act on both sides of the check valve, and the spring 96 maintains the check valve seated. Upon connecting line 81 to exhaust, and simultaneously supplying pressure air to an opposite side of the piston head 71, the pressure within the piston chamber acts on the check valve 95 to unseat the valve and permit the pressure within the chamber rapidly to dissipate out the pasageways 94 and 84 and through the air line 81. The valves 83 therefore completely control the rate of movement of the piston 71 within the cylinder 67.

In feeding workpieces of a cylindrical configuration, there is a tendency sometimes for more than one workpiece to roll through the transfer channel 52 on the out stroke of the plunger 57. To prevent such undesirable feeding from occurring, a retaining member may be interposed within the transfer channel 52. Referring to FIG. 1, it is seen that an inverted U-shaped recess 101 is formed in the lower edge of the guide rail 44 which defines one wall of the transfer conduit 52. This recess is located quite near the storage channel 59. A retaining pin 102 is receivable within the recess 101 but is biased downwardly to a channel blocking position by a flat spring 103 which is attached at opposite ends to the pin 102 and a slotted head fitting 104 fixed to the cover plate 58.

In operation, retraction of the plunger 57 outwardly of the channel 52 permits the flat spring 103 to bias the retaining pin 102 downwardly and out of the recess 101 and into the channel 52. Continued retraction of the plunger 54 then permits a workpiece to drop from the storage magazine channel 59 to the inlet of the transfer channel. Because the retaining pin 102 is positioned closely adjacent the inlet end of the transfer channel, only one such workpiece can drop into the transfer channel. Thus the pin 102 prevents a workpiece from rolling from the inlet end of the channel toward the outlet end of the channel and thereby insures one at a time feeding of the workpieces on each stroke of the plunger 57. Upon inward movement of the plunger 57 within the channel 52 the workpiece that is dropped into the inlet end of the channel forces the retaining pin upwardly and into the recess 102.

As mentioned hereinabove, in certain types of machining operations, such as hollow milling and the tapping of external threads, the rotating parts of the machine tool are necessarily of such a configuration that an unmachined workpiece must be maintained in a minimum spaced relation from the working station.

In accordance with the form of the invention illustrated in FIGS. 1 to 4, there is provided a pivotal arm or clip for retaining workpieces at the top of the feeding channel during a machining operation at the working station. Referring to FIGS. 1 and 2, it is seen that the portion of the inner edge of the guide rail 43 that extends beyond the lower edge of the guide rail 44 may be hollow milled to form a recessed face 106. A pivotal arm in the form of a flat spring 107 is attached at one end to the upper portion of the recessed face 106 and is interposed in channel 51 so as to extend across the feeding channel 51 to contact the guide plate 48. Also, the outermost end of the plunger 57 is preferably formed with a sloping face 57E. Thus, a workpiece that is transferred through the channel 52 by the plunger 57 engages the upper inclined surface of the flat spring arm 107. The spring 107 and the inclined face 57E of the plunger support the workpiece at the upper end of the feeding channel 51. Upon the down stroke of the plunger 54 and the concurrent retraction of the plunger 57, the spring arm 107 is pivoted or moved due to its innate resiliency back into the recess 106, and the workpiece moves toward the working station 13 while being pressed and engaged by the spring arm 107 during the major portion of transfer movement. In addition to maintaining the workpiece in spaced relation from the working station during the machining operation, the spring 107 has a beneficial effect of minimizing the tendency of the workpiece to cant during the down stroke of the plunger 54.

While the positive positioning unit 41 has been illustrated and described in relation to a machine having a particular type of gripping jaw and backup stop, the positive positioning fixture is not limited to operating with such a machine. The interchangeable guide rails 43 and 45 and guide plate 48 enable the positioning unit to be readily adapted for operation with a wide variety of machine tools. Thus, for example, the positive positioning fixture could also be used with a machine performing separate machining operations on different ends of the workpiece.

The form of the invention illustrated in FIG. 5 of the drawings is a fixture 120 wherein provision is made for a gravity feed of the individual workpieces directly into the vertical feed path or channel which opens at the working station. Additionally, rather than having a pivotal workpiece release arm which is pivotal due to its inherent resiliency when cammed by a workpiece, the release arm in the form of the invention shown in FIG. 5 is a rigid member, pivotally mounted, and under normal spring bias to normally withhold a workpiece from the work station.

As in the foregoing embodiment, a workpiece WP1, FIG. 5, is to be gripped at the working station between a pair of jaws 121 and 122. These jaws can be opened and closed one relative to the other in general conformity to what has been described above, but an escapement as 35 is not necessary.

The jaws 121 and 122, FIG. 5, are located on what amounts to the forward side of a main frame member 125 of the machine tool. A magazine backing plate 127 is also secured to the frame of the machine tool, and this backing plate is disposed in a generally vertical plane. The magazine in this instance includes a pair of guide plates 130 and 131 having spaced vertical side edges 130V and 131V which define a vertical magazine feed channel 132. The guide plate 130 is positioned to the right on the backing plate 127 as viewed in FIG. 5 and is formed with a pair of elongated slots 135 and 136. These slots are sloped downwardly to the left as viewed in FIG. 5, and each of these slots is aligned with a related tapped opening 137 and 138 in the backing plate 127. A screw (not shown) of the kind 46 described above is adapted to be threadedly mounted in each tapped opening 137 and 138 to secure the guide plate 130 to the backing plate 127. It will be recognized that the elongated slots 135 and 136 enable the guide plate 130, when such screws are loosened, to be moved toward or away from the opposed guide plate 131. This enables the edge 130V of the guide plate 130 to be adjusted horizontally relative to the opposed edge 131V of the guide plate 131. True parallelism of movement is assured by beveling the lower edge 140 of the guide plate 130 and disposing this beveled edge in engagement with the inclined upper edge 141U of a guide plate 141 secured to the backing plate 127 below the guide plate 130.

The guide plate 131 includes a lower leg 146 having an edge 146E which is angled downwardly to the left as viewed in FIG. 5, and the lower edge 146E thereof is inclined at an angle identical to the opposed edge 141U of the guide 141. Thus, the opposed edges 141U and 146E afford a downwardly inclined extension 132E of the channel 132. Consequently, workpieces in the vertically straight portion of the magazine channel 132 are adapted to move by gravity therefrom into the inclined extension 132E, and it will be appreciated that workpieces will be fed by hand into the uppermost open end of the magazine feed channel 132.

As in the instance of the guide plate 130 which is adjustable horizontally, the guide plate 131 is adjustable, but in a vertical direction. This is so in order that the edges 141U and 146E can be spaced in accordance with the edges 130V and 131V. This mode of adjustment is accomplished in a manner similar to that described above in connection with the plate 130. Thus, the guide plate 131 is formed with three enlarged slots 152, 153 and 154. These slots are elongated in a truly vertical direction and each is associated with a related tapped opening in the backing plate 127; such tapped openings being identified at 157, 158 and 159, each adapted to receive a screw as 46 above for securing the guide plate 131 in an adjusted vertical position.

It will be recognized from the foregoing that the plates 130 and 131 are adjustable to accommodate workpieces of different width. Thus, when workpieces of different diameter in comparison to those represented by the workpiece WP1 are to be machined, guide plate 131 will be shifted upwardly and guide plate 130 will be shifted to the right as viewed in FIG. 5 by the requisite amount.

The lower end of the plate 141 terminates in a vertically straight edge 160 which bounds a feed path 161 that leads to the working station. This edge is spaced from the vertically straight edge 162 of a pivotal workpiece release arm 165 which will be described in more detail below. The feed path or channel 161 extends from communication with the lower end of the magazine feed channel 132 to the working station whereat a workpiece as WP1 is in working position. The retaining arm 165 is formed on its edge 162 with a shoulder 165S which is located at the juncture of the channels 132E and 161. Normally, this shoulder is interposed in the feed path 161 at said juncture to retain the next workpiece WP2 spaced from the working station until machining operations on the workpiece WP1 have been completed in one working cycle of the machine tool. In the next working cycle, the machined workpiece WP1 is to be released from the clamping jaws 121 and 122 by opening the latter in an accurately timed relationship, and substantially at the same time the workpiece WP2 is to be released or freed by the arm 165 to be moved into working position. As will be described, a plunger 167 is to be effective at this time to move the freed workpiece WP2 positively to the working station while holding the following workpiece WP3 at the threshold of the terminal end of the magazine feed channel.

The release arm 165 is in the form of an elongated dog, and this arm at its upper end is mounted for pivotal movement on a pivot pin 168 which is secured to a slide block 169. The slide block 169, it will be noted, is disposed for sliding movement in a recess 170 formed in the back plate 127. This recess extends at right angles to the feed path 161. The end of the block 169 adjacent the arm 165 is formed with a narrow slot 173. The pivoted end of the arm 165 is disposed in the slot 173, and the pivot pin 168 is related to aligned openings in the arm 165 and the slotted end of the block 169. It will be noted that the slot 173 is sufficiently deep to enable the arm 165 to freely swing therein to the extent required.

The block 169 is formed with an elongated adjusting slot 178. This slot is aligned with a tapped opening 180 in the back plate 127 adapted to receive a retainer screw such as 46 identified above. In other words, the slide 169 can be positioned in the recess 170 to enable the release arm 165 to be positioned relative to the edge 160 of the plate 141 to accommodate workpieces of different size in the feed path 161.

The arm 165 is held in the normal workpiece retaining position illustrated in FIG. 5 by a plunger pin 183. The plunger pin 183 is disposed generally normal to the general disposition of the arm 165, and is guided in a corresponding opening 184 in a guide block 185. The guide block 185 is slotted vertically at 185S, and the release arm is disposed therein for pivotal movement. The guide block 185 is formed with a pair of enlarged openings as 186, and these openings are registered with tapped openings as 187 in the back-up plate. Again, this is so to enable an adjustment for workpieces of different size to be made. Thus, retainer screws are adapted to be disposed in the tapped openings as 187 with enlarged washers (not shown) spanning the openings 186 and engaged by the heads of the retainer screws. These screws, when tightened, hold the guide block 185 in a selected position. The enlarged openings as 186 are sufficiently large to enable the block 185 to be adjusted not only in a vertical direction but also in a horizontal direction and the selected position of the block 185 will be gauged to that of the block 169.

A spring force is applied to the left-hand end of the plunger pin 183, and this force is exerted by the lower end of a leaf spring 190 bearing thereagainst. The upper end of this spring is anchored by a cap screw 191 seated in a lug 192 on the back plate 127. The tension of the spring 190 is selected so that it is normally effective to urge the pin 183 to dispose the arm 165 with the shoulder 165S located in position to trap the next workpiece as WP2 to be machined.

The plunger 167 extends vertically, as noted, and is disposed between the release arm 165 and the lower edge of the guide plate 131 so as to be aligned with the feed path 161. The edge of the plunger 167 that is adjacent the release arm 165 is slotted longitudinally at 193. The release arm 165 includes a projection 165P which is disposed in the slot 193 so as to serve as a guide for the plunger 167.

The plunger 167, in normal position, has the lower end thereof disposed just above the next workpiece as WP2 that is to be machined. The upper end of the plunger 167 is secured to the rod 194 of a piston operable in a pneumatic power cylinder 195 of the kind described above. The power cylinder is secured to the backing plate 127 by clamping screws as 196 and the shanks of these screws are disposed in elongated slots 197 formed in the backing plate so that the cylinder 195 and plunger 167 can be shifted laterally of the feed path 161 to accommodate workpieces of different width.

The cylinder 195 will be operated in an accurately timed relationship with respect to operation of the clamping jaws 121 and 122. Thus, after machining of the workpiece WP1 in a cycle of the machine, the jaws 121 and 122 are opened to release the workpiece WP1. Simultaneously with such releasing of the finished workpiece WP1, the plunger 167 will be driven downwardly to engage the workpiece WP2. Further downward movement of the plunger 167 is accompanied by movement of the workpiece WP2 down the feed path 161. At this occurs, the workpiece WP2 is effective to cam the release arm 165 to the left as viewed in FIG. 5 against the action of the leaf spring 190. At the same time, the right-hand edge of the plunger 193, as viewed in FIG. 5, is interposed at the juncture between the magazine feed channel and the feed path 161. Consequently, the plunger 167 is effective to hold the next workpiece WP3 at the threshold of the lower end of the magazine feed channel, and all other workpieces as WP4 behind the workpiece WP3 are backed up in the magazine feed channel.

The downward stroke of the plunger 167 is sufficient to positively move the new workpiece as WP2 to the working position represented by the location of the workpiece WP1. It will be recognized that, as this is occurring, the spring 190 is effective to apply a force to the release arm 165 so that the workpiece WP2 moving into working position is in frictional contact at both sides with the edge 162 of the release arm 165 and the opposed edge 160 of the guide plate 140. The clamping jaw 121 has the forwardmost edge 121E thereof coplanar with the edge 160 of the guide plate 141 as a continuation of the feed path 161. Additionally, the clamping jaw 121 is formed with an arcuate recess 121R that will be complemental to the particular workpieces.

Eventually, the workpiece moving downward in the feed path 161 is presented to the arcuate surface 121R of the jaw 121. When the workpiece next to be machined is in this position, it is then forcefully moved laterally of the feed path 161 into the recess 121R by the lower end of the release arm 165 which, as will be noted in FIG. 5, extends downward to be opposite the recess 121R.

In this manner, a new workpiece is moved into working position on the downward stroke of the plunger 167. The plunger 167, on its return stroke, will eventually reach the position illustrated in FIG. 5, and as this occurs, the workpiece WP3 is free to move by gravity onto the shoulder 165S of the release arm 165 to be in position next to be fed to the working station in the next cycle of the machine.

It will be noted from FIG. 5 that the portion of the release arm 165 below the shoulder 165S is aligned with the slot 193 in the plunger 167, and hence the plunger 167 is guided thereby once the plunger 167 moves therealong. Further, the clamping jaw 122 is slotted at 122S to enable the lower end of the release arm 165 to move therein as is required at the time when a new workpiece is moving downward along the feed path 161.

It should be noted that the positive positioning fixtures include their own power pistons. The adjustable or interchangeable parts accommodate a wide variety of workpieces.

Particularly in the instance of the fixture of FIG. 5, the pivotal retainer not only retains a new workpiece in position next to be fed to the working station, but also acts to apply a positive force to trap the workpiece being formed at the work station. In this instance also, no more than gravity is used to feed workpieces to the intermediate station, and yet the parts can be easily adjusted for workpieces of different size.

In accordance with the form of the invention shown in FIGS. 1 to 4, there is provided a pair of perpendicularly disposed plungers for successively transferring an element to be machined first through a transfer channel and then to a feeding channel which incorporates a pneumatically powered, double-acting piston connected to one of the plungers through a bell crank for causing simultaneous actuation of the plungers in opposite directions within the channels.

Regulating valves are provided to regulate the rate at which air is supplied to the piston to prevent the plunger from impacting on the work elements within the channels. Both positioning fixtures incorporate a retaining member for insuring one-at-a-time feed to the machine tool and for retaining one machined element in spaced relation from the working station of the machine tool.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a machine tool, a pair of clamping jaws positionable to grip and release a workpiece at a working station, first means including a resilient biasing element for retaining a workpiece at the working station in the workpiece releasing position of the clamping jaws, guide members forming a workpiece feed channel aligned with the working station and open at one end to the working station, second means for supplying an individual workpiece to an end of the feed channel opposite the working station, a plunger slidable within the feed channel for positively transferring an individual workpiece from the inlet end of the channel to the working station, and means for sliding said plunger within the said channel sufficiently far to engage a workpiece in said channel with a workpiece disposed within the working station and eject the workpiece disposed within the working station past the first resiliently biased retaining means.

2. In a machine tool, a pair of clamping jaws positionable to grip and release a workpiece at a working station, an escapement member slidably affixed to one of the clamping jaws and having a beveled edge facing the opposite jaw, means resiliently biasing the escapement member to a position wherein the escapement member retains a workpiece at the working station in the workpiece releasing position of the clamping jaws, guide members forming a workpiece feed channel aligned with the working station and open at one end to the working station, transfer means for positively transferring individual workpieces from a group of workpieces to an inlet end of the feed channel, a plunger reciprocable within the channel, power means for reciprocating the plunger, the stroke of the plunger within the channel being sufficient to transfer an individual workpiece from the inlet end of the channel to the working station between the clamping jaws so that said individual workpiece abuts any workpiece retained therein and ejects such workpiece between the beveled edge of the escapement member and said opposite jaw.

3. In a machine tool, a pair of clamping jaws positionable to grip and release a workpiece at a working station, first means including a resilient biasing element for retaining a workpiece at the working station in the workpiece releasing position of the clamping jaws until positively ejected therefrom, guide members forming a workpiece feed channel open at one to the working station, second means for supplying an individual workpiece to an inlet end of the feed channel opposite the working station, a resilient flexible retaining member extending across said feed channel adjacent the inlet end for retaining an individual workpiece in spaced relation with the working station, and a plunger slidable within the feed channel for positively transferring an individual workpiece from the inlet end of the channel past said retaining member and to the working station to eject any workpiece disposed therein past the first resiliently biased retaining means.

4. In a machine tool, a pair of clamping jaws positionable to grip and release a workpiece at a working station, guide members forming a workpiece feed channel open at one end to the working station, means for supplying an individual workpiece to an end of the feed channel opposite the working station, a resilient flexible retaining member extending across said feed channel adjacent the inlet and for retaining an individual workpiece in spaced relation with the working station and until positively ejected therefrom, and a plunger slidable within the feed channel for positively transferring an individual workpiece from the inlet end of the channel past said retaining member and to the working station.

5. A magazine feed unit for a machine tool comprising a pair of vertically extending guide channels, a horizontal guide channel extending therebetween, first means for positively transferring an element to be machined from one of the vertical guide channels through the horizontal channel to the other vertical guide channel, second means for positively transferring an element to be machined through said other vertical guide channel to a work-performing station of a machine tool, power means including a double-acting fluid motor for actuating said first and second means, and valve means for regulating the action of said fluid motor.

6. A magazine feed unit for a machine tool comprising guide members forming a first storage channel for storing elements to be machined, a second feeding channel for supplying elements to be machined to a work-performing station of a machine tool and a third transfer channel for transferring elements to be machined from an outlet of the storage channel to an inlet of the feeding channel, first and second plunger means slidable in the feeding channel and transfer channel respectively for positively transferring an element to be machined from the inlet ends to the outlet ends of the respective channels, power means connected to the first and second plunger means for causing simultaneous actuation of the plunger means in opposite directions within the respective channels to sequentially transfer an individual element to be machined first through the transfer channel and then through the feeding channel on successive actuations of the power means, and retaining means for retaining individual elements at predetermined positions in said feeding and transfer channels until said plunger means are actuated inwardly of said channels, said retaining means including members resiliently biased to blocking positions across said channels.

7. A magazine feed unit for a machine tool comprising guide members forming a first vertical storage channel for storing elements to be machined, a second vertical feeding channel offset from said storage channel for supplying elements to be machined to a work-performing station of a machine tool and a third horizontal transfer channel for transferring elements to be machined from an outlet of the storage channel to an inlet of the feeding channel, one of the guide members forming the transfer channel having a recess closely adjacent the inlet end of the transfer channel and opening in the channel, a retaining pin resiliently biased to a transfer channel blocking position and movable to a non-channel blocking position within the recess for regulating the number of elements to be machined that can gravity feed from the outlet of the storage channel to the inlet of the transfer channel, first and second plunger means slidable within the feeding channel and transfer channel respectively for positively transferring an element to be machined from the inlet ends to the outlet ends of the respective channels, and power means for simultaneously actuating said plungers in opposite directions within the respective channels, said power means including a double-acting power cylinder directly connected to one of said plungers, a bell crank connecting said power cylinder with the other of said plungers and operative to move said other plunger outwardly of the channel in which said other plunger is slidably disposed, and spring means biasing said other plunger inwardly of its respective channel.

8. A magazine feed unit for a machine tool comprising guide members forming a first storage channel for storing elements to be machined, a second feeding channel for supplying elements to be machined to a work-performing station of a machine tool and a third transfer channel for transferring elements to be machined from an outlet of the storage channel to an inlet of the feeding channel, first and second plunger means slidable in the feeding channel and transfer channel respectively for positively transferring an element to be machined from the inlet ends to the outlet ends of the respective channels, power means including a double acting pneumatic power cylinder connected to the first and second plunger means for causing simultaneous actuation of the plunger means in opposite directions within the respective channels to sequentially transfer an individual element to be machined first through the transfer channel and then through the feeding channel on successive actuations of the power cylinder, and adjustable air regulating valves disposed in opposite ends of the power cylinder for regulating the rate at which air is supplied to the power cylinder to prevent impacting action by the plungers on workpiece elements in the transfer and feeding channels.

9. A magazine feed unit for a machine tool comprising guide members forming a vertical feed channel for supplying workpieces to be machined to a working station, an additional vertical storage channel horizontally offset from the feed channel for storing workpieces, and a horizontal transfer channel for transferring workpieces from the lower end of the storage channel to the upper end of the feed channel, a first plunger slidable within the feed channel, a second plunger slidable within the transfer channel and spring biased inwardly of said channel, a double acting pneumatically powered piston directly connected to the first plunger, and a bell crank interconnecting the piston and said second plunger, wherein movement of the piston in one direction retracts the first plunger outwardly of the feed channel and permits the spring biased second plunger to move inwardly of the transfer channel to transfer a workpiece from the storage channel to the feed channel, and a subsequent movement of the piston in the opposite direction retracts the second piston outwardly of the transfer channel against the spring bias and simultaneously actuates the first plunger downwardly of the feed channel to transfer a workpiece through the feed channel to a working station of a machine tool.

10. In a machine tool, clamping jaw means for gripping and releasing a workpiece at a working station, means forming a workpiece feed path having an inlet end and open at the other end to the working station, means for supplying an individual workpiece to the inlet end of the feed path opposite the working station, a retaining member interposed in said feed path for retaining an individual workpiece spaced from the working station until released thereby to move to the working station, said retaining member being movable between a workpiece retaining position and a workpiece releasing position, and a plunger in the feed path for positively engaging and transferring an individual workpiece from the inlet end of the feed path to the working station when the retaining member is in its releasing position.

11. Apparatus according to claim 10 wherein the retaining member is a leaf spring arm movable as required due to its own resilience.

12. Apparatus according to claim 10 wherein the retaining member is a pivotal arm normally biased to a retaining position by a spring, said arm being pivoted out of the path of the workpiece by the workpiece itself when engaged by the plunger, and said arm being effective to hold a workpiece positioned at the working station against said jaw means.

13. Apparatus according to claim 10 wherein the retaining member includes a shoulder on which a workpiece rests until released and wherein the retaining member and plunger are adjustable laterally relative to said feed path to accommodate workpieces of different width.

14. In a machine tool, clamping jaw means for gripping and releasing a workpiece at a working station, means forming a vertical workpiece feed path having an inlet end and open at the other end to the working station, spaced plates defining a magazine gravity feed channel which opens at one end into the inlet end of said feed path, a support to which said plates are secured, a pivotal arm having a portion disposed at the juncture of said feed channel and said feed path and being normally in position to engage and prevent a workpiece at said juncture from moving down the feed path to the working station, a vertically movable plunger aligned with said feed path and having a portion thereof in position to engage and drive such engaged workpiece when actuated downward, and said arm being spring biased to said normal position and movable out of the path of such engaged workpiece as an incident to downward movement of the plunger.

15. Apparatus according to claim 14 wherein said arm is formed with a shoulder engageable by a workpiece at the juncture between the feed channel and the feed path and wherein said arm includes a portion that extends to the working station and which is effective under the spring bias exerted on the arm to hold a workpiece at the working station against said jaw means.

16. Apparatus according to claim 14 wherein said plates are adjustable on said support to vary the spacing therebetween to accommodate workpieces of varying width.

References Cited in the file of this patent
UNITED STATES PATENTS

| | | |
|---|---|---|
| 1,304,323 | Kaye | May 20, 1919 |
| 1,390,553 | Hearn et al. | Sept. 13, 1921 |
| 2,464,883 | Neumann | Mar. 22, 1949 |
| 2,509,123 | Bailey et al. | May 23, 1950 |